US006146428A

United States Patent [19]

Kalum et al.

[11] Patent Number: 6,146,428

[45] Date of Patent: Nov. 14, 2000

[54] ENZYMATIC TREATMENT OF DENIM

[75] Inventors: Lisbeth Kalum, Raleigh, N.C.; Bente Konggaard Andersen, Lyngby, Denmark

[73] Assignee: Novo Nordisk A/S, Bagsværd, Denmark

[21] Appl. No.: 09/283,176

[22] Filed: Apr. 1, 1999

Related U.S. Application Data

[60] Provisional application No. 60/081,136, Apr. 9, 1998.

[30] Foreign Application Priority Data

Apr. 3, 1998 [DK] Denmark ........................... 1998 00484

[51] Int. Cl.[7] ..................................................... C09B 67/10

[52] U.S. Cl. ................................... 8/401; 8/102; 435/263

[58] Field of Search ......................... 8/102, 401; 435/263

[56] References Cited

U.S. PATENT DOCUMENTS

| | | | |
|---|---|---|---|
| 4,912,056 | 3/1990 | Olson | 435/263 |
| 4,997,450 | 3/1991 | Olson et al. | 8/109 |
| 5,114,426 | 5/1992 | Milora et al. | 8/102 |
| 5,122,159 | 6/1992 | Olson et al. | 8/401 |
| 5,213,581 | 5/1993 | Olson et al. | 8/401 |
| 5,246,853 | 9/1993 | Clarkson et al. | 435/263 |
| 5,435,809 | 7/1995 | Holst et al. | 8/401 |
| 5,525,507 | 6/1996 | Clarkson et al. | 435/263 |
| 5,565,006 | 10/1996 | Videbaek et al. | 8/102 |
| 5,650,322 | 7/1997 | Clarkson et al. | 435/263 |
| 5,654,193 | 8/1997 | Clarkson et al. | 435/263 |
| 5,674,427 | 10/1997 | Videbaek et al. | 252/8.91 |
| 5,749,923 | 5/1998 | Olip et al. | 8/102 |
| 5,752,980 | 5/1998 | Pedersen et al. | 8/111 |
| 5,811,381 | 9/1998 | Emalfarb et al. | 510/320 |
| 5,851,233 | 12/1998 | Pedersen et al. | 8/102 |
| 5,871,550 | 2/1999 | Goedegebuur et al. | 8/137 |
| 5,908,472 | 6/1999 | Vollmond | 8/102 |
| 5,912,407 | 6/1999 | Miller et al. | 8/139 |

FOREIGN PATENT DOCUMENTS

| | | | |
|---|---|---|---|
| WO 98/02531 | 1/1998 | Japan . | |
| 10088472A | 4/1998 | Japan | D06L 3/02 |
| WO 90/02790 | 3/1990 | WIPO | C11D 11/00 |
| WO 92/16685 | 10/1992 | WIPO | D06P 5/00 |

OTHER PUBLICATIONS

Chemical Abstracts, vol. 128, The Abstract No. 99297, Jan. 22, 1998.

*Primary Examiner*—Yogendra Gupta
*Assistant Examiner*—Christine Ingersoll
*Attorney, Agent, or Firm*—Steve T. Zelson; Valeta Gress

[57] ABSTRACT

A method of introducing into the surface of dyed denim fabric or garment, localized areas of variations in colour density, the method comprising contacting the fabric or garment with an aqueous composition comprising an effective amount of a pectolytic enzyme preferably selected from the group consisting of pectin lyases (EC 4.2.2.10), galactanases (EC 3.2.1.89), arabinanases (EC 3.2.1.99), pectin esterases (EC 3.1.1.11), mannanases (EC 3.2.1.78), polygalacturonases (EC 3.2.1.15) and pectate lyases (EC 4.2.2.2) at a pH of the aqueous composition between 3 and 11 and a temperature of or below 90° C.

36 Claims, No Drawings

ENZYMATIC TREATMENT OF DENIM

CROSS-REFERENCE TO RELATED APPLICATIONS

This application claims priority under 35 U.S.C. 119 of Danish application PA 1998 00484 filed Apr. 3, 1998 and of U.S. Provisional application Ser. No. 60/081,136 filed Apr. 9, 1998, the contents of which are fully incorporated herein by reference.

FIELD OF THE INVENTION

The present invention relates to a method of treating denim fabric with a pectolytic enzyme, more specifically to a method of enzymatically introducing a stone-washed finish to the surface of denim fabric or garment, a method of improving the conventional enzymatic stone-washing of denim, and a method for removing backstained dye from denim fabric during a conventional finishing process by using a pectolytic enzyme.

BACKGROUND OF THE INVENTION

The popularity of denim fabrics among consumers of all ages has been well documented by sales in a large number of countries throughout the world.

Denim is most often cotton cloth. A conventional dyestuff for denim is the dye indigo having a characteristic blue colour, the indigo-dyed denim cloth having the desirable characteristic of alteration of dyed threads with white threads which upon normal wear and tear gives denim a white on blue appearance.

A popular look for denim is the stone-washed or worn look. Stonewashing of denim jeans and other garment has been known for years (American Association of Textile Chemists and Colorists: Garment Wet Processing Technical Manual, North Carolina, U.S.A (1994)), originally using laundering with abrasive stones to accelerate the aging process before selling the product in retail stores, later by introducing chlorine bleach into these wash techniques, and in the past years by using cellulolytic enzymes either alone or in combination with abrasive stones (WO 90/02790).

However, many cellulases have an activity towards insoluble cellulose which may result in a reduced strength of the cellulosic fabric in question. Accordingly, it is an object of the present invention to create an enzymatic process for manufacturing a fabric or a garment with a "stone-washed" look, a "worn" look or any other fashion look known in the art based on providing fabric or garments with localized variation in colour density, wherein the used enzyme has no or only a very low activity towards insoluble cellulose.

SUMMARY OF THE INVENTION

It has been found that it is possible to subject dyed denim fabric or garment to an enzymatic treatment with an enzyme having pectolytic activity, thereby obtaining a stone-washed appearance of the fabric or garment or an improvement of the conventional enzymatic (cellulolytic) stone-washing process or, when applied in the conventional denim finishing process, a removal of backstained dye from the fabric or garment.

Accordingly, in a first aspect the invention relates to a method of introducing into the surface of dyed denim fabric or garment, localized areas of variations in colour density, which method comprises contacting the fabric or garment with an aqueous composition comprising an effective amount of a pectolytic enzyme. The pectolytic enzyme is preferably selected from the group consisting of pectate lyases, pectin lyases and polygalacturonases.

In a second aspect, the present invention provides a method for improved enzymatic stone-washing of dyed denim fabric or garment, which method comprises contacting the fabric or garment with an aqueous composition comprising a cellulolytic enzyme and a pectolytic enzyme in an amount efficient for providing enzymatic abrasion of the fabric or garment.

In a further aspect, the invention also provides a method for removing backstained dye from denim fabric or garment during finishing, the method comprising treating the garment with an aqueous composition comprising an effective amount of a pectolytic enzyme.

DETAILED DESCRIPTION OF THE INVENTION

Fabric

The present invention relates to the treatment of denim fabric or garment, i.e. denim fabric made from cellulosic fibres, especially cotton.

The cotton fiber is a single biological cell. The layers in the cell structure are, from the outside to the dinsede, cuticle, primary wall, seccondary wall, and lumen. These layers are different structurally and chemically. The primary and secondary walls have different degrees of crystallinity, as well as different molecular chain orientations. The cuticle, composed of wax, proteins, and pectins, is 2.5% of the fiber weight and is amorphous. The primary wall is 2.5% of the fiber weight, has a crystallinity index of 30%, and is composed of cellulose. The secondary wall is 91.5% of the fiber weight, has a crystallinity index of 70%, and is composed of cellulose. The lumen is composed of protoplasmic residues. It is known that waxy materials are mainly responsible for the non-absorbent characteristics of raw cotton. Pectins may also have an influence, since 85% of the carboxyl groups in the pectins are methylated (Li, Y. and Hardin, I. R. in Textile Chemist and Colorist, 1997, Vol. 29. No. 8. p. 71–76). In this context, the term "pectin" denotes pectate, polygalacturonic acid, and pectin which may be esterified to a higher or lower degree.

Preferably the dyeing of the denim yarn, fabric or garment is a ring-dyeing. A preferred embodiment of the invention is ring-dyeing of the yarn with a vat dye such as indigo, or an indigo-related dye such as thioindigo, or a sulfur dye, or a direct dye, or a reactive dye, or a naphthol. The yarn may also be dyed with more than one dye, e.g., first with a sulphur dye and then with a vat dye, or vice versa. The indigo may be derived from the indigo plant material, or synthetic, or the biosynthetic indigo available from Genencor International. The warp thread may be dyed according to methods known in the art, typically by using a continuously process in which the yarn is repeatedly dipped into dyebaths containing the dye in question (e.g. indigo in reduced (leuco) form). Following each dip, the indigo is oxidized by exposing the thread to oxygen (a process known as skying). Alternatively the indigo may be oxidized with other oxidizing agents as known in the art.

The dyeing may be carried out in the following way: Initially the dry warp thread is pre-wetted, typically the wet out mix contains a wetting agent, a chelating agent and sodium hydroxide.

The warp thread may then be dipped in the dye-bath for 5–60 sec, squeezed, and oxidized in the air for 1–3 min. The treatment may be performed as 4-dip, 8-dip, or other degrees of treatment as known in the art. Conventionally, the dyebath comprises water, indigo dye, sodium hydroxide and optionally hydrosulfite or other chelating or wetting agents.

After the dyeing operation the dyed yarns are optionally sized before they are woven.

The skilled person in the art will realise that the effective amount of a pectolytic enzyme to be used in the method of the present invention will vary depending upon a number of well understood parameters, including the purity and the specific activity of the pectinase, the contact time, the pH, the temperature of the aqueous process medium, the presence of abrasives (pumice, perlite, diatomaceous earth, ECO-balls) and the machinery used for fabric (e.g. denim) wet processing:

Machinery for Fabric Wet Processing

When processing fabric, in particular denim, the mechanical action is a very important parameter to consider in order to obtain the desired abrasion level. The machine design plays an important role in getting the desired abrasion level. Abrasion comes from fabric-to-fabric, fabric-to-metal or fabric-to-stone/abrasive contact.

The machines function primarily as a washer. Since denim processing started in industrial laundries most of the equipment has been an adaptation of washing machines. Two main categories exist today: Washer Extractor and Barrel Machines. Washer extractors are characterized by having an internal rotating drum which makes extraction possible, and there are two basic designs of washer extractor: Front-loaded and side washers. Cylinder design vary widely. The diameter of the cylinder in a front load washer extractor is generally greater than the length of the cylinder. It rotates along its horizontal axis and is loaded through an opening in the end. Side-loading machines are similar to front loaders in the basic design principles, however, the cylinder is longer than its diameter, it rotates along its horizontal axis and is loaded through openings in the side.

Baffles are protruding from the inside of the drum which help keep the garments moving for better abrasion. The garments are lifted with the help of the baffles to the top of the drum and then fall back into the wash liquor.

Barrel (or hexagonal) washers are designed with only one drum. The machine is designed especially for stonewashing jeans. The mechanical effect, from both fabric-to-fabric and fabric-to-drum contact, is very high resulting in a very effective stonewash.

According to the present invention a Barrel washer is preferred.

The Enzyme

The term "pectolytic enzyme" or "pectinase" as denoted herein, is intended to include any pectinase enzyme defined according to the art where pectinases are a group of enzymes that hydrolyse glycosidic linkages of pectic substances mainly poly-1,4-a-D-galacturonide and its derivatives(see reference Sakai et al., Pectin, pectinase and propectinase: production, properties and applications, pp 213–294 in: Advances in Applied Microbiology vol:39,1993) which enzyme is understood to include a mature protein or a precursor form thereof or a functional fragment thereof which essentially has the activity of the full-length enzyme. Furthermore, the term "pectolytic" enzyme is intended to include homologues or analogues of such enzymes.

Preferably a pectolytic enzyme useful in the method of the invention is a pectinase enzyme which catalyzes the random cleavage of a-1,4-glycosidic linkages in pectic acid also called polygalacturonic acid by transelimination such as the enzyme class polygalacturonate lyase (EC 4.2.2.2) (PGL) also known as poly(1,4-a-D-galacturonide) lyase also known as pectate lyase. Also preferred is a pectinase enzyme which catalyzes the random hydrolysis of a-1,4-glycosidic linkages in pectic acid such as the enzyme class polygalacturonase (EC 3.2.1.15) (PG) also known as endo-PG. Also preferred is a pectinase enzyme such as polymethylgalcturonate lyase (EC 4.2.2.10) (PMGL), also known as Endo-PMGL, also known as poly(methyoxygalacturonide)lyase also known as pectin lyase which catalyzes the random cleavage of a-1,4-glycosidic linkages of pectin. Other preferred pectinases are galactanases (EC 3.2.1.89), arabinanases (EC 3.2.1.99), pectin esterases (EC 3.1.1.11), and mannanases (EC 3.2.1.78).

The enzyme preparation useful in the present invention is preferably derived from a microorganism, preferably from a bacterium, an archea or a fungus, especially from a bacterium such as a bacterium belonging to Bacillus, preferably to an alkalophilic Bacillus strain which may be selected from the group consisting of the species *Bacillus licheniformis* and highly related Bacillus species in which all species are at least 90% homologous to *Bacillus licheniformis* based on aligned 16S rDNA sequences. Specific examples of such species are the species *Bacillus licheniformis, Bacillus alcalophilus, Bacillus pseudoalcalophilus*, and *Bacillus clarkii.* A specific and highly preferred example is the species *Bacillus licheniformis*, ATCC 14580. Other useful pectate lyases are derivable from the species *Bacillus agaradhaerens*, especially from the strain deposited as NCIMB 40482; and from the species *Aspergillus aculeatus*, especially the strain and the enzyme disclosed in WO 94/14952 and WO 94/21786 which are hereby incorporated by reference in their entirety; and from the species *Bacillus subtilis, Bacillus stearothermophilus, Bacillus pumilus, Bacillus cohnii, Bacillus pseudoalcalophilus*, Erwinia sp. 9482, especially the strain FERM BP-5994, and *Paenibacillus polymyxa.*

The pectolytic enzyme may be a component occurring in an enzyme system produced by a given microorganism, such an enzyme system mostly comprising several different pectolytic enzyme components including those identified above.

Alternatively, the pectolytic enzyme may be a single component, i.e. a component essentially free of other pectinase enzymes which may occur in an enzyme system produced by a given microorganism, the single component typically being a recombinant component, i.e. produced by cloning of a DNA sequence encoding the single component and subsequent cell transformed with the DNA sequence and expressed in a host. Such useful recombinant enzymes, especially pectate lyases, pectin lyases and polygalacturonases are described in detail in e.g. applicants co-pending International patent applications nos. PCT/DK98/00514 and PCT/DK98/00515 which are hereby incorporated by reference in their entirety including the sequence listings. The host is preferably a heterologous host, but the host may under certain conditions also be the homologous host.

The pectinase to be used in the method of the present invention may be obtained or derived from a microorganism by use of any suitable technique. For instance, a pectinase preparation may be obtained by fermentation of a microorganism and subsequent isolation of a pectinase containing preparation from the fermented broth or microorganism by methods known in the art, but more preferably by use of recombinant DNA techniques as known in the art. Such method normally comprises cultivation of a host cell transformed with a recombinant DNA vector capable of expressing and carrying a DNA sequence encoding the pectinase in question, in a culture medium under conditions permitting the expression of the enzyme and recovering the enzyme from the culture. The component comprised by the enzyme composition of the invention may also be produced by conventional techniques such as produced by a given microorganism as a part of an enzyme system.

The pectin degrading enzyme useful in this invention may, further to the enzyme core comprising the catalytically domain, also comprise a cellulose binding domain (CBD), the cellulose binding domain and enzyme core (the catalytically active domain) of the enzyme being operably linked. The cellulose binding domain (CBD) may exist as an integral part of the encoded enzyme, or a CBD from another origin may be introduced into the pectin degrading enzyme thus creating an enzyme hybride. In this context, the term "cellulose-binding domain" is intended to be understood as defined by Peter Tomme et al. "Cellulose-Binding Domains: Classification and Properties" in "Enzymatic Degradation of Insoluble Carbohydrates", John N. Saddler and Michael H. Penner (Eds.), ACS Symposium Series, No. 618, 1996. This definition classifies more than 120 cellulose-binding domains into 10 families (I–X), and demonstrates that CBDs are found in various enzymes such as cellulases, xylanases, mannanases, arabinofuranosidases, acetyl esterases and chitinases. CBDs have also been found in algae, e.g. the red alga *Porphyra purpurea* as a non-hydrolytic polysaccharide-binding protein, see Tomme et al., op.cit. However, most of the CBDs are from cellulases and xylanases, CBDs are found at the N and C termini of proteins or are internal. Enzyme hybrids are known in the art, see e.g. WO 90/00609 and WO 95/16782, and may be prepared by transforming into a host cell a DNA construct comprising at least a fragment of DNA encoding the cellulose-binding domain ligated, with or without a linker, to a DNA sequence encoding the pectin degrading enzyme and growing the host cell to express the fused gene. Enzyme hybrids may be described by the following formula:

CBD—MR—X wherein CBD is the N-terminal or the C-terminal region of an amino acid sequence corresponding to at least the cellulose-binding domain; MR is the middle region (the linker), and may be a bond, or a short linking group preferably of from about 2 to about 100 carbon atoms, more preferably of from 2 to 40 carbon atoms; or is preferably from about 2 to to about 100 amino acids, more preferably of from 2 to 40 amino acids; and X is an N-terminal or C-terminal region of the pectin degrading enzyme of the invention.

In the present context, the term "cellulase" or "cellulolytic" enzyme refers to an enzyme which catalyses the degradation of cellulose to glucose, cellobiose, triose and other cello-oligosaccharides which enzyme is understood to include a mature protein or a precursor form thereof or a functional fragment thereof, e.g. a catalytic active domain, which essentially has the activity of the full-length enzyme. Furthermore, the term "cellulolytic" enzyme is intended to include homologues or analogues of said enzyme.

The cellulolytic enzyme may be a component occurring in a cellulase system produced by a given microorganism, such a cellulase system mostly comprising several different cellulase enzyme components including those usually identified as e.g. cellobiohydrolases, exo-cellobiohydrolases, endoglucanases, b-glucosidases.

Alternatively, the cellulolytic enzyme may be a single component, i.e. a component essentially free of other cellulase enzymes usually occurring in a cellulase system produced by a given microorganism, the single component typically being a recombinant component, i.e. produced by cloning of a DNA sequence encoding the single component and subsequent cell transformed with the DNA sequence and expressed in a host, for example as described e.g. International Patent Application WO 91/17243 and which is hereby incorporated by reference. The host is preferably a heterologous host, but the host may under certain conditions also be the homologous host.

The cellulase to be used in the method of the present invention may be obtained or derived from a microorganism by use of any suitable technique. For instance, a cellulase preparation may be obtained by fermentation of a microorganism and subsequent isolation of a cellulase containing preparation from the fermented broth or microorganism by methods known in the art, but more preferably by use of recombinant DNA techniques as known in the art. Such method normally comprises cultivation of a host cell transformed with a recombinant DNA vector capable of expressing and carrying a DNA sequence encoding the cellulase component in question, in a culture medium under conditions permitting the expression of the enzyme and recovering the enzyme from the culture. The component comprised by the cellulase composition of the invention may also be produced by conventional techniques such as produced by a given microorganism as a part of a cellulase system.

The cellulase to be used according to the present invention may be any cellulase component having cellulolytic activity either in the acid, the neutral or the alkaline pH-range. Preferably, the component is a microbial endog-β-1,4-glucanase (EC 3.2.1.4), preferably comprising a catalytic core domain (CAD) and one or more cellulose binding domains (CBD) operably linked to the core domain or, in the case of two or more cellulose binding domains, to a cellulose binding domain, preferably of fungal or bacterial origin, which may be derived or isolated and purified from microorganisms which are known to be capable of producing cellulolytic enzymes, e.g. species of the genera mentioned below. The derived cellulases may be either homologous or heterologous cellulases. Preferably, the cellulases are homologous. However, a heterologous component, which is derived from a specific microorganism and is immunoreactive with an antibody raised against a highly purified cellulase component possessing the desired property or properties, is also preferred.

Examples of specific endo-β-1,4-glucanases useful according to the present invention are: cellulases derived from any of the fungal genera Acremonium, Ascobolus, Aspergillus, Chaetomium, Chaetostylum, Cladorrhinum, Colletotrichum, Coniothecium, Coprinus, Crinipellis, Cylindrocarpon, Diaporthe, Diplodia, Disporotrichum, Exidia, Fomes, Fusarium, Geotrichum, Gliocladium, Humicola, Irpex, Macrophomina, Melanocarpus, Microsphaeropsis, Myceliophthora, Nectia, Neocallimastix, Nigrospora, Nodulisporum, Panaeolus, Penicillium, Phanerochaete, Phycomyces, Piromyces, Poronia, Rhizomucor, Rhizophyctis, Saccobolus, Schizophyllum, Scytalidium, Sordaria, Spongopellis, Systaspospora, Thermomyces, Thielavia, Trametes, Trichothecium, Trichoderma, Volutella, Ulospora, Ustilago, Xylaria; especially acid cellulases derived from the fungal species *Trichoderma reesei, Trichoderma viride, Trichoderma longibrachiatum*; cellulases from the fungal species *Ascobolus stictoideus, Aspergillus aculeatus, Chaetomium cuniculorum, Chaetomium brasiliense, Chaetomium murorum, Chaetomium virescens, Chaetostylum fresenii,*

*Cladorrhinum foecundissimum, Colletotrichum lagenarium,* Coprinus, *Crinipellis scabella*, Cylindrocarpon, *Diaporthe syngenesia, Diplodia gossypina, Exidia glandulosa, Fomes fomentarius, Fusarium oxysporum, Fusarium poae, Fusarium solani, Fusarium anguioides,* Geotrichum, *Gliocladium catenulatum, Humicola nigrescens, Humicola grisea*, Irpex, *Macrophomina phaseolina, Melanocarpus albomyces*, Microsphaeropsis, *Myceliophthora thermophila, Nectria pinea, Neocallimastix patriciarum,* Nigrospora, Nodulisporum, *Panaeolus retirugis, Penicillium chrysogenum, Penicillium verruculosum*, Phanerochaete, *Phycomyces nitens,* Piromyces, *Poronia punctata, Rhizomucor pusillus, Rhizophlyctis rosea, Saccobolus dilutellus, Schizophyllum commune, Scytalidium thermophilum, Sordaria fimicola, Sordaria macrospora,* Spongopellis, *Syspastospora boninensis, Thermomyces verrucosus, Thielavia thermophila, Thielavia terrestris* NRRL 8126, *Trametes sanguinea, Trichothecium roseum, Trichoderma harzianum, Volutella colletotrichoides, Ulospora bilgramii, Ustilago maydis, Xylaria hypoxylon, Myceliophthora thermophila, Humicola insolens, Humicola lanuginosa, Humicola grisea;* and endo-β-1,4-glucanases which are immunoreactive with an antibody raised against a highly purified ~43 kD endoglucanase derived from Humicola insolens, DSM 1800, or which is a homologue or derivative of the ~43 kD endo-β-1,4-glucanase exhibiting cellulase activity, such as the endoglucanase having the amino acid sequence disclosed in PCT Patent Application No. WO 91/17243, SEQ ID#2 or a variant of this endoglucanase having an amino acid sequence being at least 60%, preferably at least 70%, more preferably 75%, more preferably at least 80%, more preferably 85%, especially at least 90% homologous therewith; and cellulases from the bacterial genera Bacillus, Pseudomonas, Saccharothrix, Cellvibrio, Thermomonospora; especially from the s species *Bacillus lentus, Bacillus agaradhaerens, Bacillus licheniformis, Pseudomonas cellulosa, Saccharothrix australiensis, Saccharothrix texasensis, Saccharothrix waywayandensis, Saccharothrix cryophilis, Saccharothrix flava, Saccharothrix coeruleofusca, Saccharothrix longispora, Saccharothrix mutabilis* ssp. capreolus, *Saccharothrix aerocolonigenes, Saccharothrix mutabilis* ssp. mutabilis, *Saccharothrix syringae, Cellvibrio mixtus, Thermomonospora fusca.* References are made to the detailed disclosure of the mentioned cellulases in the International Patent Applications published as WO94/01532, WO94/14953, WO96/11262, WO96/19570 and WO96/29397; further examples are the cellulases disclosed in the published European Patent Application No. EP-A2-271 004.

Examples of commercially available cellulase enzyme products useful in the method of the present invention are: Cellusoft® Celluclast®, Denimax® Acid, Denimax® Ultra (all available from Novo Nordisk A/S, DK-2880 Bagsvaerd, Denmark); Indiage™, Primafast™ (both from Genencor International Inc., U.S.A.); Powerstone™ (from Iogen, Canada); Ecostone™ (from Alko, Finland); Rocksoft™ (from CPN, U.S.A.), and Sanko Bio™ (from Meiji/Rakuto Kasei Ltd., Japan).

The Process

In its first aspect, the invention provides a method for introducing into the surface of dyed denim fabric or garment, localized variations in colour density which method comprises the step of contacting the fabric or garment with an aqueous composition comprising an effective amount of a pectolytic enzyme.

In a second aspect, the conventional enzymatic stonewashing process may be improved by treating the denim fabric or garment with an aqueous composition comprising a cellulase and a pectinase in an amount effective for providing abrasion of the fabric.

In a third aspect, the invention provides a method for removing backstained dye from denim fabric or garment during finishing by, in an aqueous medium, treating the fabric or garment with an effective amount of pectinase. Without being bound to this theory it is believed that backstaining is due to redeposition of insoluble dye, such as insoluble indigo dye, either in the pectin layer present as part of the cuticle of cotton fiber or trapped into the hydrophobic wax also present in the cuticle of cotton fiber.

Further, it is contemplated that pectolytic enzymes are useful for removal of pectins present in the cuticle of cotton fiber prior to dyeing of warp yarns.

It is at present advised that a suitable liquor/textile ratio to be used in the present method may be in the range of from about 20:1 to about 1:1, preferably in the range of from about 15:1 to about 2:1.

In conventional desizing and "stone-washing" processes, the reaction time is usually in the range of from about 10 min to about 8 hours. Preferably the reaction time is within the range of from about 10 to about 120 minutes.

The pH of the reaction medium greatly depends on the enzyme(s) in question. Preferably the process of the invention is carried out at a pH in the range of from about pH 3 to about pH 11, preferably in the range of from about pH 4 to about pH 8 more preferably in the range from about pH 4.5 to about pH 7, or within the range of from about pH 4.5 to about pH 5.5.

The temperature of the reaction medium also greatly depends on the enzyme(s) in question. Normally a temperature in the range of from 10–90° C. will be used, preferably a temperature below 90° C., more preferably below 75° C. such as in the range of from 50–75° C. will be used, more preferably a temperature below 65° C. such as in the range of from 60–65° C. will be used. Sometimes the temperature used for the desizing process and the abrasion process will be the same, but normally they will be different as shown in the examples below.

The efficient amount of pectolytic enzyme to be used according to the method of the present invention depends on many factors, but according to the invention the concentration of the pectolytic enzyme in the aqueous medium may be from about 0.01 to about 10000 microgram enzyme protein per g of fabric, preferably 0.1–10000 microgram of enzyme protein per g of fabric, more preferably 1–1000 microgram of enzyme protein per g of fabric.

An efficient amount of cellulolytic enzyme to be used according to the method of the present invention depends on many factors, but according to the invention the concentration of the cellulolytic enzyme in the aqueous medium may be 0.001–50 mg of enzyme protein per g of fabric, preferably 0.005–25 mg of enzyme protein per g of fabric, more preferably 0.01–5 mg of enzyme protein per g of fabric.

The aqueous composition used in the method of the invention may further comprise one or more enzymes selected from the group consisting of proteases, lipases, cutinases, cellulases, hemicellulases, pectinases, amylases, oxidoreductases, peroxidases, laccases, and transferases.

Pumice may also be added to the aqeuous treatment composition in an amount of 0–80% relative to the amount which is conventionally used for stonewashing jeans with pumice in a conventional stonewashing process.

A buffer may be included in the aqeuous composition to maintain a suitable pH for the enzyme(s) used. The buffer may suitably be a phosphate, borate, citrate, acetate, adipate, triethanolamine, monoethanolamine, diethanolamine, carbonate (especially alkali metal or alkaline earth metal, in particular sodium or potassium carbonate, or ammonium and HCl salts), diamine, especially diaminoethane, imidazole, or amino acid buffer.

The method of the invention may be carried out in the presence of conventional textile finishing agents, including wetting agents, polymeric agents, surfactants/dispersing agents, chelating agents etc.

A conventional wetting agent may be used to improve the contact between the substrate and the enzymes used in the process. The wetting agent may be a nonionic surfactant, e.g. an ethoxylated fatty alcohol. A very useful wetting agent is an ethoxylated and propoxylated fatty acid ester such as Berol 087 (product of Akzo Nobel, Sweden).

Examples of suitable polymers include proteins (e.g. bovine serum albumin, whey, casein or legume proteins), protein hydrolysates (e.g. whey, casein or soy protein hydrolysate), polypeptides, lignosulfonates, polysaccharides and derivatives thereof, polyethylene glycol, polypropylene glycol, polyvinyl pyrrolidone, ethylene diamine condensed with ethylene or propylene oxide, ethoxylated polyamines, or ethoxylated amine polymers.

The dispersing agent may suitably be selected from nonionic, anionic, cationic, ampholytic or zwitterionic surfactants. More specifically, the dispersing agent may be selected from carboxymethylcellulose, hydroxypropylcellulose, alkyl aryl sulphonates, long-chain alcohol sulphates (primary and secondary alkyl sulphates), sulphonated olefins, sulphated monoglycerides, sulphated ethers, sulphosuccinates, sulphonated methyl ethers, alkane sulphonates, phosphate esters, alkyl isothionates, acylsarcosides, alkyltaurides, fluorosurfactants, fatty alcohol and alkylphenol condensates, fatty acid condensates, condensates of ethylene oxide with an amine, condensates of ethylene oxide with an amide, sucrose esters, sorbitan esters, alkyloamides, fatty amine oxides, ethoxylated monoamines, ethoxylated diamines, alcohol ethoxylate and mixtures thereof. A very useful dispersing agent is an alcohol ethoxylate such as Berol 08 (product of Akzo Nobel, Sweden).

In another aspect of the invention, it is possible to improve the ability of pectolytic enzymes, especially the pectate lyases and pectin lyases, to provide localized colour variations in dyed fabrics by adding a chelating agent to the composition.

The chelating agent may be one which is soluble and capable of forming complexes with di- or trivalent cations (such as calcium) at acid, neutral or alkaline pH values. The choice of chelating agent depends on the cellulase employed in the process. Thus, if an acid cellulase is included, the chelating agent should be one which is soluble and capable of forming a complex with di- or trivalent cations at an acid pH. If, on the other hand, the cellulase is neutral or alkaline, the chelating agent should be one which is soluble and capable of forming a complex with di- or trivalent cations at a neutral or alkaline pH.

The chelating agent may suitably be selected from aminocarboxylic acids; hydroxyaminocarboxylic acids; hydroxycarboxylic acids; phosphates, di-phosphates, tripolyphosphates, higher poly-phosphates, pyrophosphates; zeolites; polycarboxylic acids; carbohydrates, including polysaccharides; hydroxypyridinones; organic compounds comprising catechol groups; organic compounds comprising hydroxymate groups; silicates; or polyhydroxysulfonates.

When the chelating agent is a hydroxycarboxylic acid, it may suitably be selected from gluconic acid, citric acid, tartaric acid, oxalic acid, diglycolic acid, or glucoheptonate.

When the chelating agent is a polyamino- or polyhydroxy-phosphonate or -polyphosphonate, it may suitably be selected from PBTC (phosphonobutantriacetat), ATMP (aminotri(methylenphosphonic acid)), DTPMP (diethylene triaminpenta(methylenphosphonic acid), EDTMP ethylene diamintetra(methylenphophonic acid)), HDTMP (hydroxyethylethylendiamintri (methylenphosphonic acid)), HEDP (hydroxyethane diphosphonic acid), or HMDTMP (hexamethylendiamine tetra (methylene phosphonic acid)).

Conventional finishing agents that may be present in a method of the invention include, but are not limited to pumice stones and/or perlite. Perlite is a naturally occurring volcanic rock. Preferably, heat expanded perlite may be used.

In a preferred embodiment of the invention the process is a combi-process, i.e. the process is a combined desizing and abrasion process.

Determination of Pectate Lyase Activity

The Viscosity Assay APSU

APSU units: The APSU unit assay is a viscosity measurement using the substrate polygalacturonic acid with no added calcium.

The substrate 5% polygalacturonic acid sodium salt (Sigma P-1879) is solubilised in 0.1M Glycin buffer pH 10. The 4 ml substrate is preincubated for 5 min at 40° C. The enzyme is added (in a volume of 250 $\mu$l) and mixed for 10 sec on a mixer at maximum speed, it is then incubated for 20 min at 40° C. For a standard curve double determination of a dilution of enzyme concentration in the range of 5 APSU/ml to above 100 APSU/ml with minimum of 4 concentrations between 10 and 60 APSU per ml. The viscosity is measured using a MIVI 600 from the company Sofraser, 45700 Villemandeur, France. The viscosity is measured as mV after 10 sec.

For calculation of APSU units a enzyme standard dilution as described above was used for obtaining a standard curve. The GrafPad Prism program, using a non linear fit with a one phase exponential decay with a plateau, was used for calculations. The plateau plus span is the mV obtained without enzyme. The plateau is the mV of more than 100 APSU and the half reduction of viscosity in both examples was found to be 12 APSU units with a standard error of 1.5 APSU.

The Lyase Assay (at 235 nm)

For determination of the S-elimination an assay measuring the increase in absorbance at 235 nm was carried out using the substrate 0.1% polygalacturonic acid sodium salt (Sigma P-1879) solubilised in 0.1M Glycin buffer pH 10. For calculation of the catalytic rate an increase of 5.2 Absorbency at 235 units per min corresponds to formation of 1 $\mu$mol of unsaturated product (Nasuna and Starr (1966) J. Biol. Chem. Vol 241 page 5298–5306; and Bartling, Wegener and Olsen (1995) Microbiology Vol 141 page 873–881).

Steady state condition using a 0.5 ml cuvette with a 1 cm light path on a HP diode array spectrophotometer in a temperature controlled cuvette holder with continuous measurement of the absorbency at 235 nm. For steady state a linear increase for at least 200 sec was used for calculation of the rate. It was used for converted to formation $\mu$mol per min product.

Determination of Cellulase Activity

The cellulolytic activity may be determined in endocellulase units (ECU) by measuring the ability of the enzyme to reduce the viscosity of a solution of carboxymethyl cellulose (CMC).

The ECU assay quantifies the amount of catalytic activity present in the sample by measuring the ability of the sample to reduce the viscosity of a solution of carboxymethylcellulose (CMC). The assay is carried out in a vibration viscosimeter (e.g. MIVI 3000 from Sofraser, France) at 40° C.; pH 7.5; 0.1M phosphate buffer; time 30 min; using a relative enzyme standard for reducing the viscosity of the CMC substrate(Hercules 7 LFD), enzyme concentration approx. 0.15 ECU/ml. The arch standard is defined to 8200 ECU/g.

One ECU is amount of enzyme that reduces the viscosity to one half under these conditions.

The following non-limiting examples illustrate the invention.

MATERIALS AND METHODS

Reflection Measurements

The reflection measurements which define the look of the fabric according to the invention are performed at a wavelength of 420 nm using a reflectometer having a measuring diaphragm with a diametrical dimension of 27 mm (Texflash 2000 from Datacolor International, light source D65). All reflection measurements are expressed in % related to a white standard (100% reflection).

The white standard used was a Datacolor International serial no. 2118 white calibration standard.

For calibration purposes a black standard was also used (no. TL-4-405).

The higher the value the lighter the colour.

Warp or Weft Tear Strength

Standard test method for tear resistance for woven fabrics by falling-pendulum Elmendorf Apparatus, ASTM D 1424, using a Elmendorf Tearing Tester, Twing-Albert Instrument CO., Philadelphia, USA 19154. However, due to the very high strength of denim fabric, the dimensions of the cutting die have been reduced to 102 mm×55 mm. Conditioning of the fabric has been accomplished at 20° C. and 60% RH for 24 hours prior to testing.

Backstaining

Backstaining is measured on the reverse side of the denim panels using a reflectometer having a measuring diaphragm with a diametrical dimension of 27 mm (Texflash 2000 from Datacolor International, light source D65). Backstaining is expressed by using the CIELAB (-b*) coordinate.

EXAMPLE 1

Evaluation of Pectate Lyase in Launder-O-Meter

Desizing of Denim Fabric

Apparatus: Washing machine, Wascator FOM 71 lab (Electrolux)

Fabric: 2 pieces of 1.5×1.65 m fabric, Blue Denim DAKOTA 14½ oz, Swift, 100% cotton.

Washing procedure:

Desizing: 20 l de-ionized water, 25 min., 75° C., 67 g Termamyl 120 L (amylase from Novo Nordisk A/S), 10 g Novozym 735 (lipase from Novo Nordisk A/S), 6.7 g $KH_2PO_4$, 20 g $Na_2HPO_4$, 2 $H_2O$, 0.4 g $CaCl_2$, 2 $H_2O$, 10 g Kieralon CD (BASF)

Drain Rinse 1: 20 l tap water, 15 min., 80° C., 26.7 g $Na_2CO_3$.

Drain Rinse 2: 5 min, 20 l tap water, 55° C.

Drain Rinse 3: 5 min., 20 l de-ionized water, 15° C.

Drain, extraction, tumbledrying. The desized denim fabric is cut into 13×23 cm swatches, which are sown together to form a tube.

Launder-O-Meter Evaluation

Apparatus: Launder-O-meter LP2 (Atlas Electric Devices Company)

Fabric: The desized denim tube is placed in the Launder-O-meter beaker with the warp (front) facing the interior, 1 swatch per beaker. Approx. 14 g/swatch.

Buffer: 50 ml 50 mM triethanol amine, pH 7.5+10 mM $CaCl_2$ is added to each beaker.

Enzyme: Pectate lyase from Bacillus licheniformis, batch 9643. Cellulase: Denimax Ultra (commercial product from Novo Nordisk A/S), batch ED-9713927. The enzymes are dosed according to the experimental outline.

Time: 60 min.

Temperature: 60° C.

Abrasive aid: 30 steel nuts (d. 16 mm), 10 steel nuts (d. 10 mm), 10 star shaped magnets (5 g), 3 star shaped magnets (3 g) are added to each beaker and placed inside the fabric tube.

Rinse: The swatches are transferred to 5 1 0.5 g LAS Nansa 1169 (Albright & Wilson)/l 5 min.; followed by a rinsing procedure in Wascator FL 120 (Electrolux): A hot rinse in 32 l 55° C. deionised water for 5 min. and two cold rinses in 32 l 15° C. deionised water for 5 min. The swatches are tumble dried and cut open near the seam.

Evaluation: Abrasion is measured on the fabric side facing the interior of the Launder-O-Meter beaker (determined as reflection as described above) with six determinations per swatch.

Experimental Outline

| swatch no. | Dosage of cellulase (ECU/g textile) | Dosage of pectate lyase (mg enz. protein/beaker) |
|---|---|---|
| 1–3 | 0 | 0 |
| 4–6 | 0 | 0.3 |
| 7–9 | 0 | 3 |
| 10–12 | 0 | 30 |
| 13–15 | 2.5 | 0 |
| 16–18 | 2.5 | 0.3 |
| 19–21 | 2.5 | 3 |
| 22–24 | 2.5 | 30 |

RESULTS

The results from the above experiment are shown in the following table:

Abrasion level of pectate lyase in combination with cellulase (Denimax Ultra)

| | | Dosage of pectate lyase (mg/breaker) | | | |
|---|---|---|---|---|---|
| | | 00 | 0.3 | 3.0 | 30 |
| Cellulase (ECU/g textile) | 0 | 7.42 | 7.65 | 7.88 | 7.86 |
| | 2.5 | 9.95 | 10.72 | 10.74 | 10.58 |

This experiment illustrates the effect of using one of the enzymes according to the invention, a pectate lyase, alone and in combination with a cellulase. An increase in abrasion level is obtained when treating the fabric with the pectate lyase, substantiating that pectin is present on the denim fabric. When evaluated in combination with a cellulase, surprisingly, a synergistic abrasion enhancement is seen, presumable the removal of pectin results in increased accessibility for the cellulase.

EXAMPLE 2

Evaluation of a Pectin Lyase in Wascator

Apparatus: Washing machine, Wascator FOM 71 lab (Electrolux)

Fabric: 1.1 kg denim fabric, San Francisco, Swift, 3/1 twill ring/open end, 100% cotton.

Washing Procedure

Desizing: 12 l de-ionized water, 10 min., 70° C., 5 ml Aquazyme 1200 L (amylase from Novo Nordisk a/s), 14 g $KH_2PO_4$+6 g $Na_2HPO_4$, 2 $H_2O$.

Rinse: 5 min, 20 l tap water, 50° C.

Abrasion: 20 l de-ionized water, 2 hours, 50° C., pH 6.5: 12 g $KH_2PO_4$+8 g $Na_2HPO_4$, 2 $H_2C$.

Enzyme: Pectin lyase from Aspergillus aculeatus, SP571, batch PPJ 4251, purity: 27% enzyme protein/g product.

Cellulase: Denimax Ultra (commercially available from Novo Nordisk A/S), ED-9613775. The enzymes are dosed according to the experimental outline.

Rinse 1: 20 l tap water, 15 min., 80° C., 40 g $Na_2CO_3$.

Rinse 2 & 3: Two rinse cycles of 5 min. in cold tap water.

Evaluation: Abrasion (determined as reflection using the mean value of 20 measurements), warp and weft tear strength, and backstaining.

Experimental Outline

| Trial no | Dosage of cellulase (ECU/g textile) | Dosage of pectin lyase (g enzyme protein/wash) |
|---|---|---|
| 1 | 7.5 | 0 |
| 2 | 7.5 | 0.5 |
| 3 | 7.5 | 1.0 |
| 4 | 12 | 0 |
| 5 | 16 | 0 |

RESULTS

The results from the above experiment are listed the following table:

Abrasion level, tear strength (TS) and backstaining of denim treated with pectin lyase (abb. PL) in combination with 7.5 ECU cellulase/g textile (abb. DU)

| Enzyme combi. | Abrasion % reflection | TS/N Warp | TS/N Weft | Back-staining (-b*) |
|---|---|---|---|---|
| 1 7.5 ECU/g DU | 11.87 | 33.90 | 23.30 | 10.42 |
| 7.5 ECU/g DU + 0.5 g PL | 12.45 | 32.46 | 22.79 | 10.01 |
| 7.5 ECU/g DU + 1.0 g PL | 13.0 | 28.7 | 21.00 | 9.56 |
| 12 ECU/g DU | 12.51 | 30.20 | 20.97 | 10.87 |
| 16 ECU/g DU | 13.61 | 29.07 | 20.72 | 11.45 |

A pectin lyase was evaluated in combination with cellulase (Denimax Ultra). The results clearly demonstrates an abrasion enhancement when combining a cellulase with a pectinase. Another scope of the invention is pectinases effect on backstaining of denim fabric and/or garment. Surprisingly, a significant reduction in backstaining is observed, when combining a pectin lyase with a cellulase. The pectin lyase in combination with cellulase (Denimax Ultra) did not result in excess tear strength loss neither in the warp direction nor in the the weft direction when compared to cellulase (Denimax Ultra) at equivalent abrasion levels.

EXAMPLE 3

Evaluation of a Pectate Lyase in Wascator

Apparatus: Washing machine, Wascator FOM 71 lab (Electrolux)

Fabric: 1.1 kg denim fabric, San Francisco, Swift, 3/1 twill ring/open end, 100% cotton.

Washing Procedure

Desizing: 12 l de-ionized water, 10 min., 70° C., 5 ml Aquazyme 1200 L (amylase from Novo Nordisk a/s), 14 g $KH_2PO_4$+6 g $Na_2HPO_4$, 2 $H_2O$.

Rinse: 5 min, 20 l tap water, 50° C.

Abrasion: 20 l de-ionized water, 2 hours, 60° C., pH 7.5: 25 mM triethanol amine Enzyme: Pectate lyase from Bacillus licheniformis, batch 9643.

Cellulase: Denimax Ultra (Novo Nordisk A/S), ED-9713927. The enzymes are dosed according to the experimental outline.

Rinse 1: 20 l tap water, 15 min., 80° C., 40 g $Na_2CO_3$.

Rinse 2 & 3: Two rinse cycles of 5 min. in cold tap water.

Evaluation: Abrasion (determined as reflection using the mean value of 20 measurements).

Experimental Outline

| Trial no | Dosage of cellulase ECU/g textile | Dosage of Pectate lyase (mg enzyme protein/g textile) |
|---|---|---|
| 1 | 8 | 0 |
| 2 | 8 | 0.005 |
| 3 | 8 | 0.01 |
| 4 | 8 | 0.02 |
| 5 | 8 | 0.04 |
| 6 | 0 | 0 |
| 7 | 0 | 0.01 |

RESULTS

The results from the above experiment are listed the following table:

Abrasion level, tear strength and backstaining of denim treated with a pectate lyase (abb. PL) in combination with 8 ECU cellulase/g textile (abb. DU)

| Trial | Enzyme combination | Abrasion % reflection |
|---|---|---|
| 1 | DU | 10.21 |
| 2 | DU + 0.005 mg/g PL | 10.62 |
| 3 | DU + 0.01 mg/g PL | 11.72 |
| 4 | DU + 0.02 mg/g PL | 11.03 |
| 5 | DU + 0.04 mg/g PL | 12.01 |
| 6 | blank | 7.59 |
| 7 | 0.01 mg/g PL | 7.96 |

The pectate lyase evaluated in Launder-O-meter was evaluated in combination with cellulase (Denimax Ultra) in larger scale Wascator trials. The results clearly confirm a significant abrasion enhancement when combining a cellulase with a pectinase.

What is claimed is:

1. A method of treating dyed denim fabric or garment comprising, contacting said dyed denim fabric or garment with an aqueous composition comprising an amount of pectolytic enzyme, effective to introduce to the surface of the dyed denim fabric or garment localized areas of variations in colour density, at a pH of 4 to 8.

2. The method of claim 1, wherein the pectolytic enzyme is selected from the group consisting of pectin lyases (EC 4.2.2.10), galactanases (EC 3.2.1.89), arabinanases (EC 3.2.1.99), pectin esterases (EC 3.1.1.11), mannanases (EC 3.2.1.78), polygalacturonases (EC 3.2.1.15) and pectate lyases (EC 4.2.2.2).

3. The method of claim 1, wherein the pectolytic enzyme is derived from a microorganism.

4. The method of claim 3, wherein the microorganism is a bacterium, an archea or a fungus.

5. The method of claim 4, wherein the bacterium is a Bacillus or an alkalophilic Bacillus strain.

6. The method of claim 4, wherein the bacterium is selected from the group consisting of the species *Bacillus subtilis, Bacillus licheniformis, Bacillus clarkii, Bacillus stearothermophilus, Bacillus alkalophilus, Bacillus pumilus, Bacillus cohni, Bacillus pseudoalcalophilus, Bacillus agaradhaerens,* Erwinia sp. 9482 and *Paenibacillus polmyxa.*

7. The method of claim 6, wherein the bacterium is one of *Bacillus licheniformis*, ATCC 14580, Erwinia sp. 9482 (FERM BP-5994), or *Bacillus agaradhaerens,* NCIMB 40482.

8. The method of claim 1, wherein the temperature of the aqueous composition is not higher than 90° C.

9. The method of claim 8, wherein the temperature of the aqueous composition is not higher than 75° C.

10. The method of claim 9, wherein the pH of the aqueous composition is the range from 4.5 to 7, and the temperature of the aqueous composition is not higher than 65° C.

11. The method of claim 1, wherein the dyed denim fabric or garment is indigo-dyed.

12. The method of claim 1, wherein the aqueous composition further comprises one or more enzymes selected from the group consisting of proteases, lipases, cutinases, cellulases, hemicellulases, amylases, oxidoreductases, peroxidases, laccases, and transferases.

13. A method for treating a dyed denim fabric or garment comprising, contacting said dyed denim fabric or garment with an aqueous composition comprising an amount of cellulolytic enzyme and pectolytic enzyme, effective for providing enzymatic abrasion of the fabric or garment to provide an improved enzymatic stone-washed garment, at a pH of 4 to 8.

14. The method claim 13, wherein the pectolytic enzyme is selected from the group consisting of pectin lyases (EC 4.2.2.10), galactanases (EC 3.2.1.89), arabinanases (EC 3.2.1.99), pectin esterases (EC 3.1.1.11), mannanases (EC 3.2.1.78), polygalacturonases (EC 3.2.1.15) and pectate lyases (EC 4.2.2.2).

15. The method of claim 13, wherein the pectolytic enzyme is derived from a microorganism.

16. The method of claim 15, wherein the microorganism is a bacterium, an archea or a fungus.

17. The method of claim 16, wherein the bacterium belongs to Bacillus or an alkalophilic Bacillus strain.

18. The method claim 17, wherein the bacterium is selected from the group consisting of the species *Bacillus subtilis, Bacillus licheniformis, Bacillus clarkii, Bacillus stearothermophilus, Bacillus alkalophilus, Bacillus pumilus, Bacillus cohnii, Bacillus pseudoalcalophilus, Bacillus agaradhaerens,* Erwinia sp. 9482 and *Paenibacillus polymyxa.*

19. The method of claim 18, wherein the bacterium is one of *Bacillus licheniformis*, ATCC 14580, Erwinia sp. 9482 (FERM BP-5994), or *Bacillus agaradhaerens,* NCIMB 40482.

20. The method of claim 13, wherein the temperature of the aqueous composition is not higher than 90° C.

21. The method of claim 20, wherein the temperature of the aqueous composition is not higher than 75° C.

22. The method of claim 21, wherein the pH of the aqueous composition is in the range from 4.5 to 7, and the temperature of the aqueous composition is not higher than 65° C.

23. The method of claim 13, wherein the dyed denim fabric or garment is indigo-dyed.

24. The method of claim 13, wherein the aqueous composition further comprises one or more enzymes selected from the group consisting of proteases, lipases, cutinases, hemicellulases, amylases, oxidoreductases, peroxidases, laccases, and transferases.

25. The method of claim 13, wherein the cellulolytic enzyme is derived from a microorganism.

26. The method of claim 25, wherein the microorganism is a bacterium, an archea or a fungus.

27. The method of claim 25, wherein the cellulolytic enzyme is a monocomponent cellulase.

28. The method of claim 27, wherein the cellulolytic enzyme is derived or derivable from a fungal strain selected from group of genera consisting of Trichoderma, Humicola, Fusarium, Myceliophthora, Thielavia, and Aspergillus.

29. The method of claim 28, wherein the cellulolytic enzyme is derived from *Trichoderma reesei, Humicola insolens, Fusarium oxysporum, Myceliophthora thermophila, Thielavia terrestris, Aspergillus aculeatus* or *Melanocarpus albomyces.*

30. The method of claim 29, wherein the cellulytic enzyme is derived from one of *Thielavia terrestris* NRRL 8126, *Humicola insolens* DSM 1800, or *Trichoderma reesei.*

31. The method of claim 27, wherein the monocomponent cellulase is a monocomponent endo-beta-1,4-glucanase (EC 3.2.1.4).

32. The method of claim 31, wherein the endo-β-1,4-glucase derived or derivable from a bacteria strain selected from the group of genera consisting of Bacillus, Pseudomonas, Cellvibrio, Saccharothrix, Thermomanospora.

33. The method of claim 32, wherein the endo-β-1,4-glucanase is derived from *Bacillus agaradhaerens, Cellvibrio mixtus,* or *Saccarothrix australiensis.*

34. The method of claim 31, wherein the endo-beta 4-glucanase comprises a catalytic core domain (CAD) and one or more cellulose binding domains (CBD) operably linked to the core domain or, in case of two or more cellulose binding domains, to a cellulose binding domain.

35. The method of claim 13 wherein pumice is added to aqueous composition further in an amount of 0–80% relative to the amount which is conventionally used for stonewashing jeans with pumice in a conventional stonewashing process.

36. A method for treating a dyed denim fabric or garment during finishing comprising, contacting said dyed denim fabric or garment with an aqueous composition comprising an amount of pectolytic enzyme, at a pH of 4 to 8, thus removing back stained dye from the dyed denim fabric or garment.

* * * * *